US011789443B2

(12) United States Patent
Bangslund et al.

(10) Patent No.: US 11,789,443 B2
(45) Date of Patent: *Oct. 17, 2023

(54) METHOD AND SYSTEM FOR OPERATING A SHIP

(71) Applicant: A.P. Møller Mærsk A/S, Copenhagen (DK)

(72) Inventors: Thomas Bangslund, Ølstykke (DK); Enrico Pangoni, Copenhagen (DK); Rasmus Kobberø Hansen, Vipperød (DK)

(73) Assignee: A.P. Møller Mærsk A/S, Copenhagen (DK)

( * ) Notice: Subject to any disclaimer, the term of this patent is extended or adjusted under 35 U.S.C. 154(b) by 454 days.

This patent is subject to a terminal disclaimer.

(21) Appl. No.: 16/831,433

(22) Filed: Mar. 26, 2020

(65) Prior Publication Data

US 2020/0225658 A1 Jul. 16, 2020

Related U.S. Application Data

(63) Continuation of application No. PCT/EP2018/076027, filed on Sep. 25, 2018.

(30) Foreign Application Priority Data

Sep. 28, 2017 (GB) ..................................... 1715761

(51) Int. Cl.
*H04J 3/22* (2006.01)
*G05D 1/00* (2006.01)
(Continued)

(52) U.S. Cl.
CPC ........... *G05D 1/0022* (2013.01); *B63B 49/00* (2013.01); *B63B 79/40* (2020.01); *G05D 1/0206* (2013.01);
(Continued)

(58) Field of Classification Search
CPC .... G05D 1/0022; G05D 1/0206; B63B 49/00; B63B 79/40; H04W 4/029; H04W 4/40;
(Continued)

(56) References Cited

U.S. PATENT DOCUMENTS 6,118,791 A * 9/2000 Fichou ............... H04Q 11/0478
370/468
6,273,771 B1 * 8/2001 Buckley ............... B63H 21/213
114/144 RE
(Continued)

FOREIGN PATENT DOCUMENTS

CN 101059910 A 10/2007
CN 102090059 A 6/2011
(Continued)

OTHER PUBLICATIONS

U.S. Appl. No. 16/831,366, Claim Amendment filed Sep. 16, 2022, pp. 2-7. (Year: 2022).*

(Continued)

*Primary Examiner* — Phuongchau Ba Nguyen
(74) *Attorney, Agent, or Firm* — EIP US LLP

(57) ABSTRACT

A system for controlling a ship 1 comprises a ship 1 having: a ship control unit 204 configured to determine situation information of the ship 1; and a transmitter-receiver 12 connected to the ship control unit 204 and configured to transmit the situation information. A remote control centre 18 remote from the ship 1 comprises a transmitter-receiver 16 configured to receive situation information of the ship 1; and a remote control unit 202 configured to determine pilot-control information for maneuvering the ship 1 based on the situation information and configured to transmit the pilot-control information to the ship 1 via the transmitter-receiver 16 of the remote control centre 18. The ship control unit 204 or the remote control unit 202 is configured to determine a quality of a connection between the transmitter- (Continued)

receiver 12 of the ship 1 and the transmitter-receiver 16 of the remote control centre 18.

19 Claims, 9 Drawing Sheets

(51) Int. Cl.
*H04W 4/029* (2018.01)
*H04W 4/40* (2018.01)
*H04W 76/10* (2018.01)
*B63B 79/40* (2020.01)
*B63B 49/00* (2006.01)
*G05D 1/02* (2020.01)

(52) U.S. Cl.
CPC ............. *H04W 4/029* (2018.02); *H04W 4/40* (2018.02); *H04W 76/10* (2018.02)

(58) Field of Classification Search
CPC ......... H04W 76/10; H04W 4/42; H04W 4/44; G08C 2201/51; G08C 17/02; B63H 25/00
See application file for complete search history.

(56) References Cited

U.S. PATENT DOCUMENTS

| | | | |
|---|---|---|---|
| 6,354,235 | B1 | 3/2002 | Davies |
| 6,590,831 | B1* | 7/2003 | Bennett ................ G01V 1/38 702/14 |
| 6,628,670 | B1* | 9/2003 | Galand ................ H04L 47/822 370/468 |
| 9,623,562 | B1 | 4/2017 | Watts |
| 10,001,776 | B2* | 6/2018 | Rangarajan .......... G05D 1/0055 |
| 10,328,897 | B1 | 6/2019 | Nabbe et al. |
| 2003/0130770 | A1 | 7/2003 | Matos |
| 2005/0124234 | A1 | 6/2005 | Sells et al. |
| 2007/0052548 | A1 | 3/2007 | Hankin et al. |
| 2007/0073454 | A1* | 3/2007 | Kaji .................... G05D 1/0206 701/21 |
| 2008/0070517 | A1* | 3/2008 | Brady ................... H04W 4/42 455/98 |
| 2012/0277941 | A1 | 11/2012 | Noffsinger et al. |
| 2013/0035107 | A1* | 2/2013 | Chan .................... H04W 28/20 455/453 |
| 2014/0155017 | A1* | 6/2014 | Fan ......................... H04W 4/02 455/404.1 |
| 2014/0277850 | A1 | 9/2014 | Jobs et al. |
| 2014/0354402 | A1 | 12/2014 | Joao |
| 2015/0163306 | A1 | 6/2015 | Nakagawa et al. |
| 2015/0210387 | A1 | 7/2015 | Ling |
| 2015/0277442 | A1 | 10/2015 | Ballou |
| 2016/0180721 | A1 | 6/2016 | Otulic |
| 2016/0231741 | A1 | 8/2016 | Felteau |
| 2016/0313729 | A1 | 10/2016 | Jobs et al. |
| 2017/0180330 | A1 | 6/2017 | Su et al. |
| 2017/0293302 | A1 | 10/2017 | Johnson |
| 2017/0358216 | A1* | 12/2017 | Priest .................. G08G 5/0034 |
| 2018/0261100 | A1 | 9/2018 | Rachmawati |
| 2019/0031299 | A1* | 1/2019 | Bangslund ........... G05D 1/0027 |
| 2019/0031300 | A1* | 1/2019 | Bangslund ............. B63B 35/00 |
| 2020/0218570 | A1 | 7/2020 | Schlegel et al. |
| 2021/0147045 | A1* | 5/2021 | Oestrem ................ B63B 79/15 |

FOREIGN PATENT DOCUMENTS

| | | |
|---|---|---|
| CN | 203300054 A | 11/2013 |
| CN | 103426330 A | 12/2013 |
| CN | 106341385 A | 1/2017 |
| KR | 101226012 B1 | 1/2013 |
| KR | 20140008100 A | 1/2014 |
| KR | 20160034642 A | 3/2016 |
| KR | 101707401 B1 | 2/2017 |
| WO | 9964941 A1 | 12/1999 |
| WO | 2005022779 A1 | 3/2005 |
| WO | 2016195788 A1 | 12/2016 |
| WO | 2017129859 A1 | 8/2017 |
| WO | 2017129863 A1 | 8/2017 |
| WO | 2018104582 A1 | 6/2018 |

OTHER PUBLICATIONS

International Search Report and Written Opinion dated Jan. 3, 2019 for PCT Application No. PCT/EP2018/076027.
United Kingdom Search Report dated Jan. 26, 2018 for GB Application No. 1715761.1.
International Search Report and Written Opinion dated Jan. 3, 2019 for PCT Application No. PCT/EP2018/076025.
United Kingdom Search Report dated Jan. 29, 2018 for GB Application No. 1715760.3.
United States Non-Final Office action dated Nov. 9, 2021 for U.S. Appl. No. 16/831,366.
United States Non-Final Office action dated Jun. 20, 2022 for U.S. Appl. No. 16/831,366.
United States Non-Final office action dated Feb. 2, 2023 for U.S. Appl. No. 16/831,366.
Chinese Office Action dated Jan. 6, 2023 for Chinese office action 201880070030.6.
Chinese Office Action dated Dec. 29, 2022 for Chinese office action 201880072291.1.
Rødseth et al., "Communication architecture for an unmanned merchant ship", 2013 MTS/IEEE Oceans—Bergen, 2013, pp. 1-9, doi: 10.1109/OCEANSBergen.2013.6608075, Jun. 10, 2013.
Burmeister et al., "Autonomous Unmanned Merchant Vessel and its Contribution towards the e-Navigation Implantation: The MUNIN Perspective", International Journal of e-Navigation and Maritime Economy, 1 (2014), 1-13, Elsevier, Dec. 1, 2014.
Låg et al., DNV GL Strategic research & innovation (DNV GL) Position Paper: "Ship Connectivity", Authors: Steinar Låg et al. Publisher: DNV GL, Publication year: 2015 Available at URL: https://www.dnv.com/Images/DNV%20GL%20-%20Ship%20Connectivity_tcm8-56026.pdf, Apr. 1, 2015.
Jokioinen et al., AAWA-Position Paper: "Remote and Autonomous Ships—The Next Steps", Authors: Esa Jokioinen et al., Publisher: Rolls-Royce plc Publication year: 2016, Available at URL: http://www.rolls-royce.com/~/media/Files/R/Rolls-Royce/documents/customers/marine/ship-intel/aawa-whitepaper-210616.pdf, Jan. 1, 2016.
Héyhtya et al., "Connectivity for autonomous ships: Architecture, use cases, and research challenges", 2017 International Conference on Information and Communication Technology Convergence (ICTC), 2017, pp. 345-350, doi: 10.1109/ICTC.2017.8191000, Oct. 18, 2017.
Labbé et al., "A Policy System for Traffic Management in Maritime Tactical Networks", DRDC Ottawa TR 5, 2007, Jan. 1, 2007.
Öhland et al., Bachelor thesis: "Interaction Between Unmanned Vessels and COLREGS" by Sebastian Ohland and Axel Stenman published on Apr. 12, 2017.
European Notice of Opposition dated Feb. 1, 2023 for European Application No. 18786683.5.

\* cited by examiner

| Type of situation information | Latency priority |
|---|---|
| Video feed | 1 |
| Audio feed | 2 |
| SONAR | 3 |
| Sensor feed | 4 |
| LIDAR | 5 |
| RADAR | 6 |
| GPS information | 7 |

FIG. 8

| Type of situation information | Bandwidth priority |
|---|---|
| SD Video feed | 1 |
| Audio feed | 2 |
| SONAR | 3 |
| Sensor feed | 4 |
| LIDAR | 5 |
| HD Video feed | 6 |
| RADAR | 7 |
| GPS information | 8 |

FIG. 9

METHOD AND SYSTEM FOR OPERATING A SHIP

CROSS-REFERENCE TO RELATED APPLICATIONS

This application is a continuation of International Application No. PCT/EP2018/076027, filed Sep. 25, 2018 which claims priority to UK Application No. GB 1715761.1, filed Sep. 28, 2017, under 35 U.S.C. § 119(a). Each of the above referenced patent applications is incorporated by reference in its entirety.

BACKGROUND OF THE INVENTION

The disclosure relates to, a method and to a system for operating one or more ships, in particular remote-controlled container ships, such as e.g. an unmanned remote-controlled and optionally partially autonomously operating container ships.

Assist operations, for e.g. assisting a container ship, such as e.g. a cargo vessel into port, to berth, from berth and out of port are conventionally carried out by a pilot aboard the vessel and optionally further with manned tugboats that are operated by a captain assisted by a number of other crew members.

Marine vessels need this assistance since they can typically not maneuver by themselves in the constraints of a port environment. The pilot is necessary because the pilot is familiar with the local conditions of the harbor. For example, the pilot will know the exactly where the dangerous or shallow waters are for a particular harbor. The pilot brings to the ship expertise in handling large vessels in confined waterways and expert knowledge of the port. Such expert knowledge may include local visual reference points, knowledge of tides, swells, currents and depths that might not be easily identifiable on navigation charts. Local regulations may require that a marine vessel over a certain size must use a pilots when entering local waterways such as a harbor or a port.

In general, a pilot operates the container ship in water spaces, harbors, bays, navigable channels, lakes and rivers.

Container ships are marine vessels (cargo ships) that are designed and constructed for transporting shipping containers (intermodal container). Typically, container ships carry all of their load in truck-size intermodal containers. Container ships are a common means of commercial intermodal freight transport and now carry most seagoing non-bulk cargo. Container ship capacity is measured in twenty-foot equivalent units (TEU). Typical loads are a mix of 20-foot and 40-foot (2-TEU) ISO-standard containers, with the latter predominant.

Shipping containers are stowed in the hull, i.e. below the open deck and above the open deck of a container ship. In the longitudinal direction of the container ship storage spaces divided into bays, in the transverse direction of the container ship the storage spaces divided in a number of rows and in the vertical direction the store space is divided in a number of horizontal container layers or tiers.

A container ship differs from other types of vessel such as a tug boat. For example, the purpose of a tugboat is to transfer mechanical energy from the tugboat to the marine vessel to be towed/assisted, through its engine and its propellers. Tugboats are adapted to their task by the provision of powerful diesel electric or diesel drives and have an extremely high power to tonnage ratio in order to be able to provide a large pulling/pushing force (bollard pull).

Currently a pilot must board the container ship before the container ship enters the dangerous waters of the harbor. This can particularly dangerous in bad weather and the pilot can face considerable risk of falling overboard. Container ships may have to wait before entering the port because there are a limited number of pilots.

Embodiments of the present invention aim to address the aforementioned problems.

SUMMARY

According to a first aspect, there is provided a system for controlling a ship comprising: a ship having: a ship control unit configured to determine situation information of the ship; and a transmitter-receiver connected to the ship control unit and configured to transmit the situation information; and a remote control centre remote from the ship comprising: a transmitter-receiver configured to receive situation information of the ship; and a remote control unit configured to determine pilot-control information for maneuvering the ship based on the situation information and configured to transmit the pilot-control information to the ship via the transmitter-receiver of the remote control centre, wherein the ship control unit or the remote control unit is configured to determine a quality of a connection between the transmitter-receiver of the ship and the transmitter-receiver of the remote control centre.

This means that the pilot receives information concerning the status of the ship remotely and information sent is dynamically dependent on the quality of the connection. This means that the situation information continues to be sent even if the situation information does not contain all information relating to the ship.

The determination of the quality of the connection may be determined based on a single parameter of the connection, for example bandwidth, latency, or packet loss. In some cases, the determination of the quality of the connection may be based on a plurality of parameters of the connection such as bandwidth and/or latency and/or packet loss.

Preferably the ship control unit or the remote control unit is configured to determine the quality of the connection on the basis of a determination of a latency of the connection. Preferably the determination of the latency comprises a determination as to whether a delay is below a predetermined operational latency threshold. Preferably if the delay is above the predetermined operational latency threshold, the ship control unit or the remote control unit is configured to prioritise the situation information, based on a type of the situation information, transmitted from the ship to the remote control centre.

Preferably the ship control unit or the remote control unit is configured to determine the quality of the connection on the basis of a determination of a bandwidth of the connection. Preferably the determination of the bandwidth comprises a determination as to whether the bandwidth is above a predetermined operational bandwidth threshold. Preferably if the bandwidth is below the predetermined operational bandwidth threshold, the ship control unit or the remote control unit is configured to prioritise the situation information, based on a type of the situation information, transmitted from the ship to the remote control centre.

Preferably the ship control unit or the remote control unit is configured to prioritize available bandwidth for the connection between the transmitter-receiver of the ship and the transmitter-receiver of the remote control centre based on the situation information. Preferably the available bandwidth is prioritized based on a proximity of the ship to a berthing position.

Preferably the ship control unit or the remote control unit is configured to determine the quality of the connection based on a reliability of the connection.

Preferably the remote control unit is configured to prioritize a first connection between the transmitter-receiver of the ship and the transmitter-receiver of the remote control centre, and a second connection between a transmitter-receiver of another ship and a transmitter-receiver of the remote control centre, based on situation information of the respective ships.

Preferably the ship is a container ship.

In a second aspect there is provided a remote control centre for controlling a ship, said remote control centre comprising: a transmitter-receiver configured to receive situation information of the ship; and a remote control unit configured to determine pilot-control information for maneuvering the ship based on the situation information and configured to transmit the pilot-control information to the ship, wherein the remote control unit is configured to determine a quality of a connection between the ship and the transmitter-receiver of the remote control centre.

In a third aspect there is a ship, comprising: a ship control unit configured to determine situation information of the ship; and a transmitter-receiver connected to the ship control unit and configured to transmit the situation information to a remote control centre and receive pilot control information, determined based on the situation information, from the remote control centre; wherein the ship control unit is configured to determine a quality of a connection between the transmitter-receiver of the ship and the remote control centre.

In a fourth aspect there is a method for controlling a ship comprising: receiving situation information of the ship in a control centre remote from the ship; determining pilot-control information for maneuvering the ship based on the situation information; transmitting the pilot-control information to the ship, receiving the pilot-control information in a ship control unit of the ship; and determining a quality of a connection between the ship and the remote control centre.

This means that the pilot receives information concerning the status of the ship remotely and does not have to board the ship to provide pilot control information. This means the pilot does not have to be exposed to dangerous conditions when attempting to board a ship in rough seas. By keeping the pilot in one location, time can be saved between pilot assistance operations because the pilot does not have to travel out to and back from the ship.

Various other aspects and further embodiments are also described in the following detailed description and in the attached claims with reference to the accompanying drawings, in which:

BRIEF DESCRIPTION OF THE DRAWINGS

FIG. 8 and FIG. 9 show tables of prioritization of different types of situation information;

DETAILED DESCRIPTION OF CERTAIN INVENTIVE EMBODIMENTS

Figure 1:
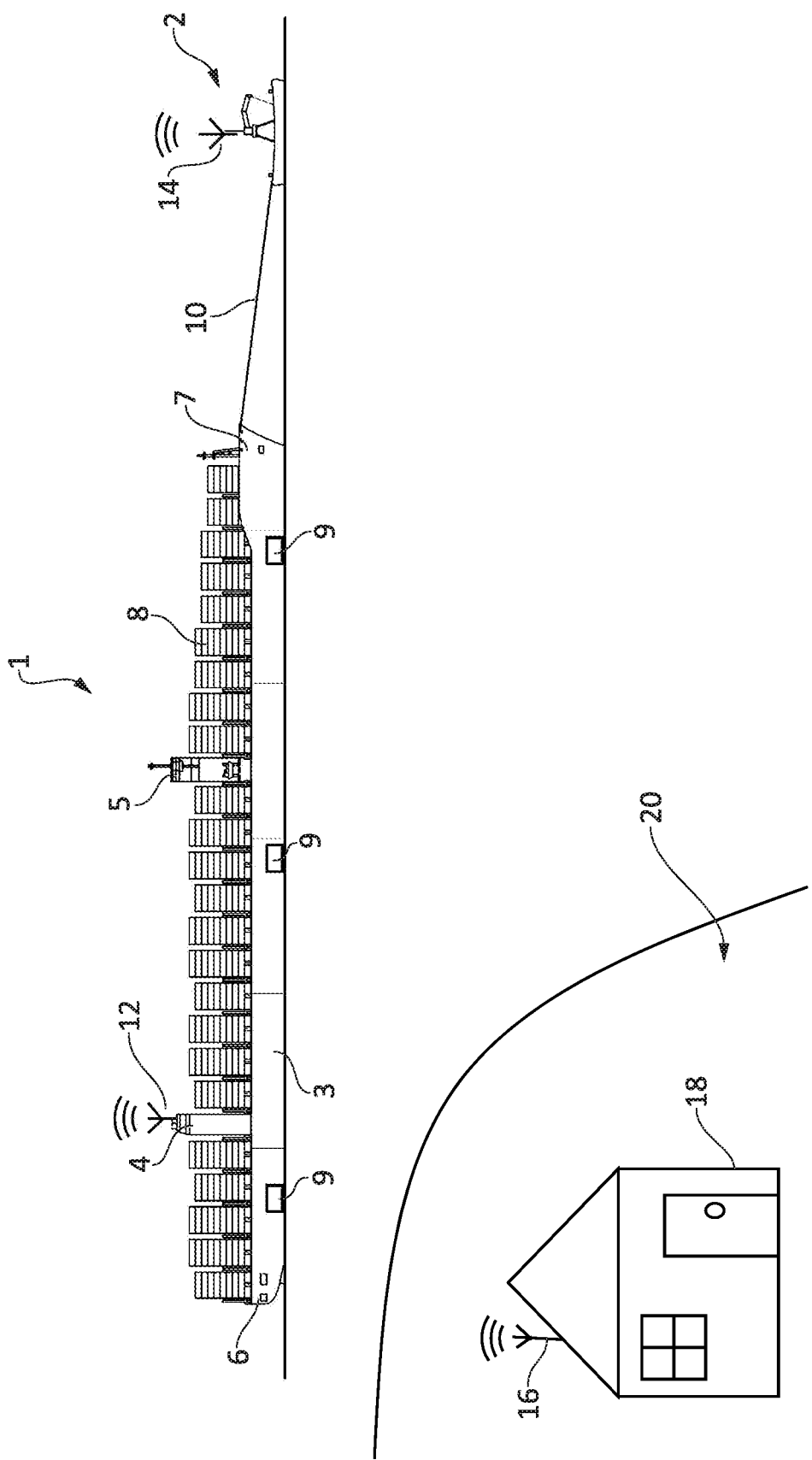
FIG. 1 shows a schematic side view of an assisted vessel and a of tugboat during an assist operation.

FIG. 1 shows a schematic side view of an assisted marine vessel 1 such as a container ship 1 and a tugboat 2 during an assist operation according to an embodiment. The tugboat 2 is connected to the container ship via towing line 10. Additional tugboats may push on the side of container ship 1 or pull the container ship from additional towing lines 10. The number of tugboats 2 involved in an assist operation depends on the size of the container ship 1, the capacity of container ship 1 to maneuver on its own account and on the pulling force (bollard pull) that can be delivered by the individual tugboats 2.

Alternatively, the container ship 1 can be any type of marine vessel 1 that needs assistance, such as e.g. a cargo ship, a tanker ship, a bulk carrier ship in FIG. 1 exemplified by a container ship. Hereinafter, the term container ship 1 will be used to describe the vessel. The example container ship shown in FIG. 1 is a container ship 1 of having a twin island designed with funnels 4 for the exhaust gases closer to the stern 6 and a bridge 5 closer to the bow 7. Containers 8 are shown stowed above deck and will normally also be stowed below deck. The side of the hull 3 is provided with strong points 9 marked with the text "TUG" for indicating the position on the hull that is suitable to be engaged by a tugboat 2 pushing onto the hull 3.

The container ship 1 is provided with bollards and capstans at several positions along the side of the vessel for attachment of a towing line 10. Typically, bollards and capstans are provided near the stern 6 and near the bow 7 and at regular intervals along the sides of the hull 3. The towing lines 10 are attached at a suitable position on the container ship 1 in accordance with the actual needs. Thus, one end of the towing line 10 is attached to the container ship 1 and the other end of the towing line 10 is attached to a tugboat 2.

As the container ship 1 nears a port, the container ship 1 may require assistance for navigating the container ship 1 through the local waterways. The captain of the container ship 1 may not be familiar with the conditions of the local waterways and depend on the knowledge of the pilot. Depending on the size of the container ship 1, the assist operation of a container ship 1 can be either a tugboat 2 assist operation and/or a pilot assist operation of only the container ship 1.

In either case a pilot is required to navigate the container ship 1 into the port or harbor. Typically, a pilot will not control the container ship 1, but advise the crew and the captain of the container ship 1 of how to navigate the local waterways. However, in some instances a pilot may take control of the ship. For example, in some jurisdictions (e.g. in the Panama Canal) it may be a requirement that the captain of the container ship 1 relinquishes control of the container ship 1 to the pilot.

Previously at the start of an assist operation, the pilot must travel out to the container ship 1 and board the container ship 1 before the container ship 1 enters the port. The pilot may travel several kilometers out to sea to meet and board the container ship 1. In some instances, the container ship 1 may have to stop and wait for the next free pilot to travel out to the container ship 1. The pilot may use a boat or a helicopter to travel out to the container ship 1.

In this way during a previous assist operation a pilot is physically on board of the container ship 1. The pilot provides instructions for maneuvering the container ship 1. The captain of the container ship 1 usually adopts the pilot's instructions. For example, a pilot may issue navigation guidance and the captain and the helmsman control the container ship 1 in line with the pilot's instructions. A pilot may not take control of the vessel for liability reasons and/or because the captain of the ship is more familiar controlling the container ship 1. For example, the captain may retain control because the captain and his crew are familiar with the ship's responsiveness.

The pilot alternatively or additionally is also in charge of controlling the movement instructions of the tugboats 2. The pilot may issue movement instructions, such as thrust commands via wireless radio communication to the captains of the respective tugboats 2 and/or the container ship 1.

In contrast, embodiment as shown in FIG. 1 means that the pilot does not have to physically board the container ship 1. FIG. 1 shows communication transmitters and receivers 12, 14, and 16 respectively on the container ship 1, the tugboat 2 and a remote control centre 18. The remote control centre 18 is remote from and at a distance to the container ship 1.

The remote control centre 18 is in communication with the container ship 1 and/or the tugboat 2. The remote control centre 18 is located on land 20. In some embodiments the remote control centre 18 has a fixed location on land, such as within a port authority but the remote location can be located in any geographical location. However, in other embodiments the remote control centre 18 can be mobile on land, fixed on the water or mobile on the water. In one embodiment the mobile control centre is a control centre where all the required information and control process is managed on a portable device such as a tablet or a virtual reality headset. The transmitters and receivers 12, 14, 16 can be any suitable communication apparatus for sending and receiving information wirelessly. For example, in some embodiments the transmitters and receivers operate over a licensed mobile telephone network using LTE (long term evolution), LTE-A, 4G communication protocol. In other embodiments, the transmitters and receivers operate over an unlicensed network such as Wi-Fi. In some embodiments the remote location is a shore based control centre. In yet other embodiments communication can be carried out with satellite communication.

The remote control centre 18 means that the container ship 1 receives the pilot's guidance and instructions from a remote location. In this way the pilot can provide advice on controlling and navigating the container ship 1 in local waterways. The pilot is located in the remote control centre 18 and does not need to board the container ship 1 or the tugboats 2. This means in bad weather the pilot does not have to experience dangerous conditions when boarding the container ship 1 and does not risk of falling overboard.

In one embodiment the remote control centre 18 controls both the container ship 1 and tugboats 2. The tugboats 2 in some embodiments are unmanned. However, in other embodiments the tugboats 2 are partly remote controlled and/or partly autonomously operating. In some embodiments the tugboats 2 are capable of operating partially autonomously in response to received instructions and partially under direct remote control.

Similarly, in some embodiments the container ship 1 is unmanned. However, in other embodiments the container ship 1 is manned, but is capable of being controlled remotely and/or partly autonomously operating. In some embodiments the container ship 1 is capable of operating partially autonomously in response to received instructions and partially under direct remote control.

Control of the container ship 1 will now be discussed in reference to the other Figures. Whilst FIG. 1 shows a tugboat 2, the other Figures do not show a tugboat for the purpose of brevity and clarity. Nevertheless, the system and method for controlling the container ship 1 as described with reference to the embodiments is also applicable to tugboats 2 at the same time. In this way in some embodiments reference to a container ship 1 also contemplates simultaneous control of a container ship 1 and tugboats 2.

Figure 2:
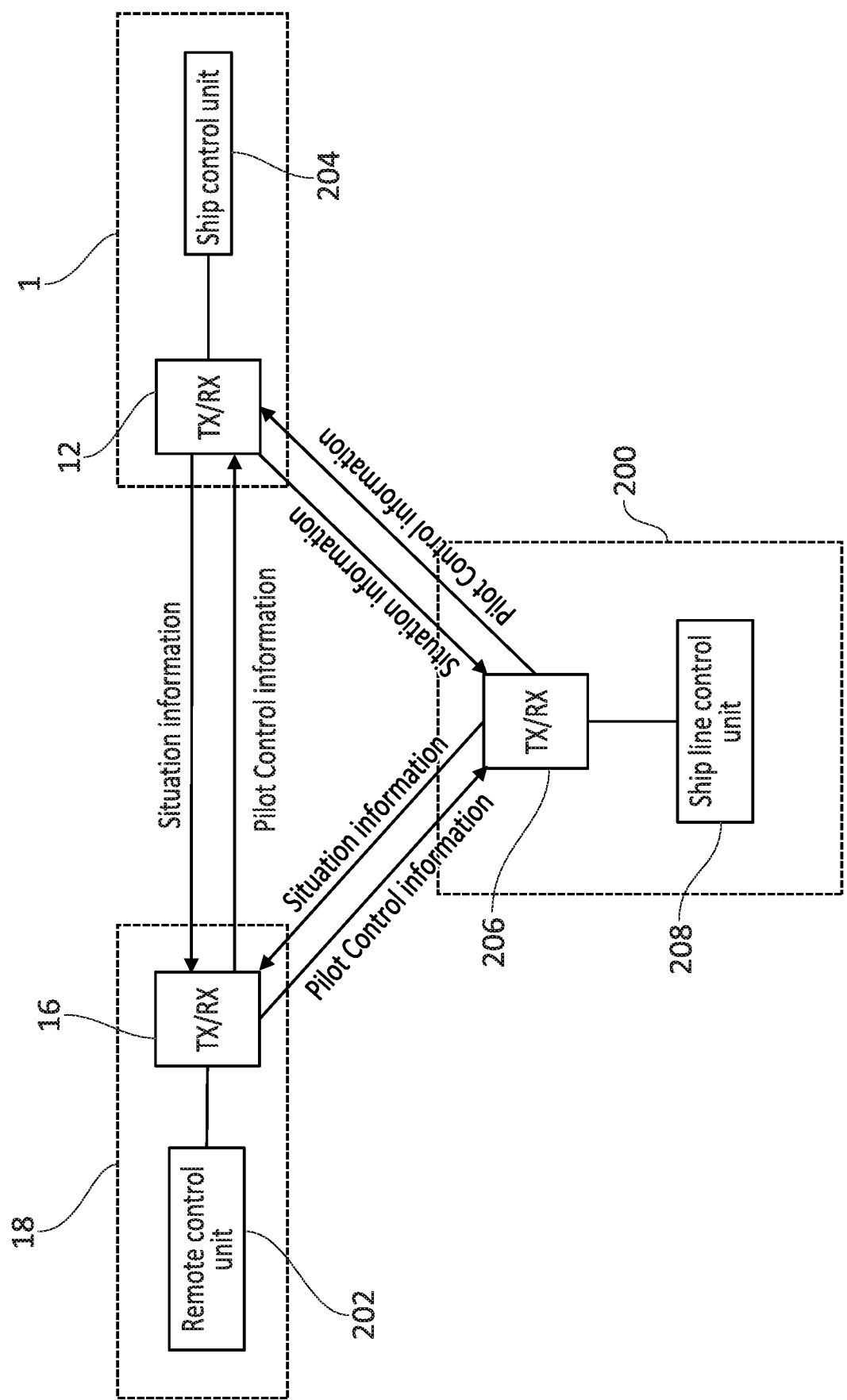
FIG. 2 shows schematic representation of a remote control centre, a ship and a ship line control centre.

An overview of the invention will now be discussed in reference to FIG. 2. FIG. 2 shows a schematic communication relationship between a remote control centre 18, a container ship 1 and a ship line control centre 200. The remote control centre 18 comprises a remote control unit 202 which is connected to a transmitter and receiver 16 for sending and receiving information. The container ship 1 comprises a ship control unit 204 which is connected to another transmitter and receiver 12 for sending and receiving information. The ship control unit 204 is configured to control the ship and process situation information of the container ship 1 and will be discussed in further detail in reference to FIG. 3. The remote control unit 202 is configured to process the situation information and generate pilot control information based on the situation information. The remote control unit 202 will be discussed in further detail in reference to FIG. 4.

As mentioned, the remote control centre 18 is configured to send pilot control information in response to received situation information of the container ship 1. In some embodiments the situation information is received directly from the container ship 1. However, optionally, in other embodiments the container ship 1 is part of a fleet owned by a ship line. The situation information of the container ship 1 is sent directly to the remote control centre 18 via a ship line control centre 200. The ship line control centre 200 receives the situation information from the container ship 1 and sends it to the remote control centre 18. The pilot control information may be received from the remote control centre 18 and the ship line control centre 200 and sent to the container ship 1. By sending the situation information via the ship line control centre, data may be aggregated by the ship line owner. In some embodiments the communication links between the container ship 1, the remote control centre 18 and the ship line control centre 200 are encrypted to protect from malicious attacks.

Figure 3:
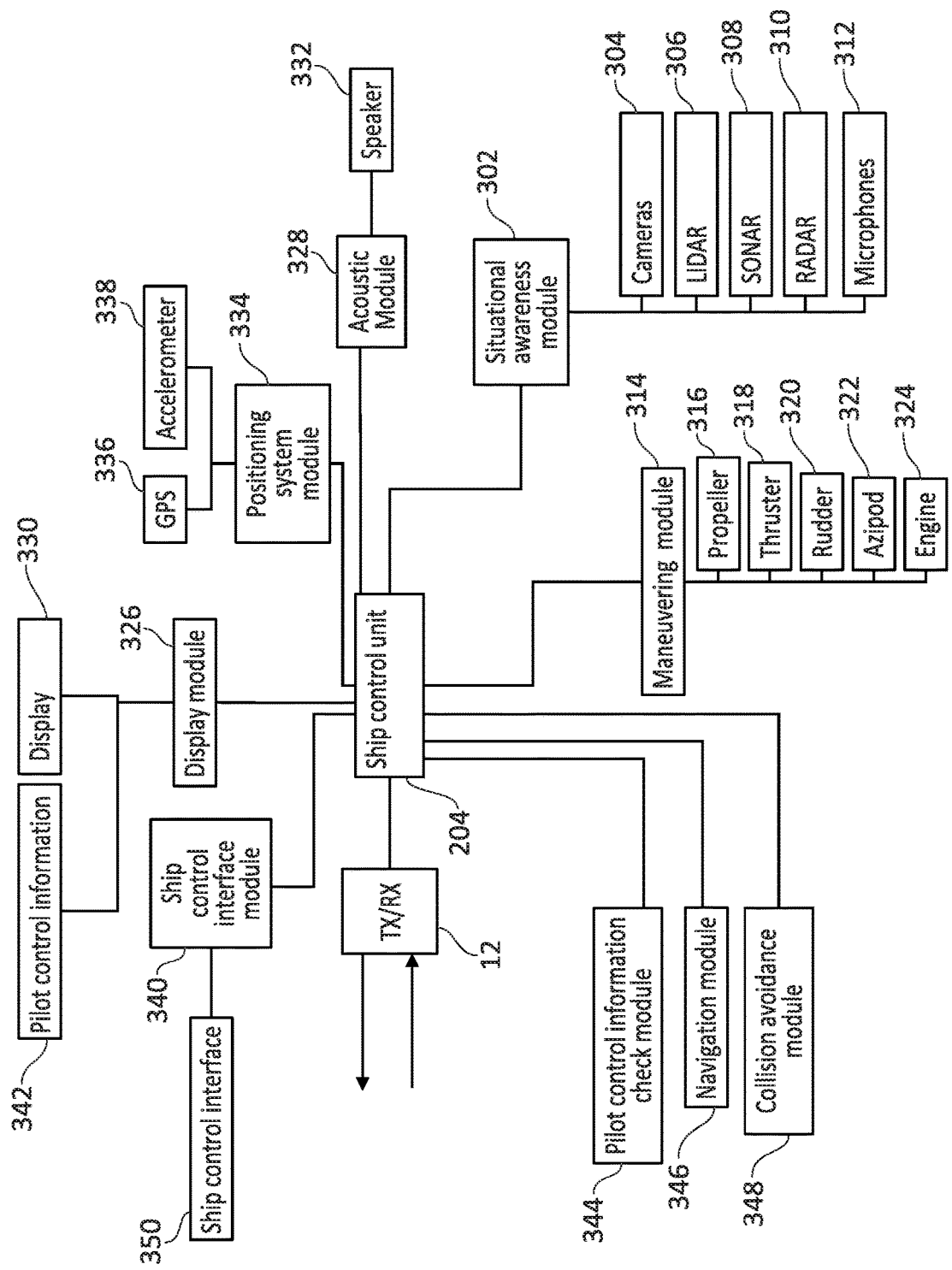
FIG. 3 shows a schematic diagram of a ship.

Turning to FIG. 3, the container ship 1 will be discussed in further detail. FIG. 3 shows a schematic representation of a control system in the container ship 1. The container ship 1 comprises a ship control unit 204. In some embodiments the ship control unit 204 is mounted and located on the container ship 1. In some embodiments the ship control unit 204 is located remote from the container ship 1. For example, large scale computer processing is carried out on shore based computer processing centres (not shown). The ship control unit 204 is configured to receive and send information relating to the container ship 1. The ship control unit 204 is configured to process information relating to the container ship 1. The ship control unit 204 comprises one or more modules for controlling systems within the container ship 1. In some embodiments the modules are part of the ship control unit 204. Alternatively, the functionality of the modules is located in one or more ancillary control units positioned on the container ship, separate from the ship control unit 204. The functionality of the ship control unit 204 and the modules can be implemented with software, hardware or a combination of both.

The ship control unit 204 is connected to a situational awareness module 302. The situational awareness module 302 is connected to at least one sensor for receiving or measuring information relating to the surroundings of the container ship 1. In some embodiments there are a plurality of cameras 304 situated around the periphery of the container ship 1. The plurality of cameras 304 can comprise a digital camera arrangement, with a 360° field of vision in the horizontal plane to offer a full view of the area around the container ship 1. The camera arrangement 304 can operate in the visual part of the spectrum and/or outside the visual part of the spectrum. The cameras 304 can be infrared cameras and/or night vision cameras for operation in low light conditions.

The situational awareness module 302 may further be connected to additional sensors including LIDAR 306, SONAR 308, RADAR 310 and microphones 312. The sensors can be any suitable sensor for detecting and measuring conditions of the ship or the environment of the container ship 1. The microphones 312 are also located around the periphery of the container ship 1 to detect audio in the vicinity of the container ship 1. In some embodiments, the microphones are directional microphones for detecting audio originating from a particular direction. The situational awareness module 302 is configured to send the information received from the sensors 304, 306, 308, 310, 312 to the ship control unit 204. This means that the ship control unit 204 receives a current situation status based on the one or more sensors.

The ship control unit 204 may output the situational information to an onboard display module 326 and an onboard acoustic module 328. The display module 326 is configured to output visual information to one or more displays 330. The displays 330 are mounted in the bridge 5 of the container ship 1. Similarly, the audio information received by the microphones 312 may be output by the acoustic module 328 to one or more speakers 332 mounted in the same area as the displays 330. Received pilot control information may be displayed by the display module 326 on a separate display 342. Alternatively, the received pilot control information may be overlaid on the other displays 330. Additionally, or alternatively the pilot control information may be audio information played through the speakers 332.

The ship control unit 204 is connected to a maneuvering module 314. The maneuvering module is configured to control one or more maneuvering units on the container ship 1. In this way the maneuvering module 314 sends signals to one or more maneuvering units to change the course and speed of the container ship 1. The maneuvering module 314 receives instructions from a navigation module 346 of the ship control unit 204.

The one or more maneuvering units of the container ship 1 are a propeller 316, a thruster 318, a rudder 320, an azipod 322, and the engine 324. The container ship 1 may have one or more of the aforementioned maneuvering units 316, 318, 320, 322, 324. Indeed, in one embodiments, the container ship 1 may have bow side thrusters, after side thrusters, two main aft propellers respectively coupled to two main engines. The maneuvering module 314 sends information relating to the current status of each of the maneuvering units to the ship control unit 204. In this way the ship control unit 204 receives a complete status picture of all the respective maneuvering units.

Additional information of the container ship 1 is received at the ship control unit 204 from a positioning system module 334. The positioning system module 334 is connected to a global positioning system 336 and one or more motion sensors 338 such as an accelerometer. The accelerometer sensor 338 is configured to is detect movement of the ship such as pitch, yaw, roll of the hull of the container ship 1. The positioning and movement information is sent to the ship control unit 204. This means that the ship control unit 204 receives information concerning the position of the container ship 1.

The ship control unit 204 is connected to a ship control interface module 340. The ship interface module 340 receives signals and input instructions from the crew in the bridge. For example, the ship interface module 340 receives instructions from the crew on a ship control interface 350 as to whether the received pilot suggested instructions are acceptable or should be rejected. The ship control interface 350 comprises a plurality of input including the helm and engine controls. In some embodiments the ship control interface 350 comprises input touch screens or keyboards.

The ship control unit 204 is provided with a navigation module 346 allowing the ship control unit 204 to navigate the container ship 1 autonomously or semi-autonomously from a first position to a second position. For example, the navigation module 346 can navigate the container ship from a present position to a received instructed position. For example, from a waiting position outside a port to a berthing position in the port.

The navigation module 346 includes nautical charts required for safe navigation of the container ship 1 and forms part of a navigation system for the container ship 1. The navigational module 346 allows the ship control unit 204 to navigate the container ship 1 from a target position to a berth position. The navigation module 346 also allows the ship control unit 346 to navigate the container ship 1 back to open waters from the berth position. Collision with obstacles in the way path of the container ship 1 is avoided by the ship control unit 204 deploying a collision avoidance module 348. With the assistance of a collision avoidance module 248 the ship control unit 204 can take evasive action if needed in order to avoid a collision with an object, such as another marine vessel, land, a bridge pillar or shallow waters.

The navigation system is preferably an autonomous navigation system configured to maneuver the container ship 1 to in all scenarios within the intentions of COLREG. COLREG compliant algorithms are stored in the ship control unit 204 so that ship control unit 204 can make the necessary course corrections in order to safely navigate in all scenarios.

The collision avoidance module 348 comprises regulatory information on preventing collisions, such as e.g. COLREGs (Convention on the International Regulations for Preventing Collisions at Sea, 1972) and takes evasive action in accordance with the rules. The collision avoidance module 348 enables the ship control unit 204 to determine when and which evasive action to take.

The ship control unit 204 is further connected to a pilot control information check module 344. When pilot control information is received from the remote control centre 18, the pilot control information check module 344 verifies that the received guidance in the pilot control information safe and does not put the ship or others in danger. The pilot control information check module 344 is connected to the navigation module 346 and collision avoidance module 348. The pilot control information check module 344 requests that the navigation module 346 and the collision avoidance module 348 process the pilot control information to check that the guidance is safe. A warning alert sent to the ship control unit is received from either navigation module 346 or the collision avoidance module 348 determines that the pilot control information is incorrect. Further discussion of this is made with reference to FIG. 6.

The ship control unit 204 is connected to a transmitter receiver 12 for transmitting information from the container ship 1 to the remote control centre 18. The transmitted information can comprise any information relating to the container ship. In some embodiments, the ship control unit 204 sends situation information from container ship 1 to the remote control centre 18. In some embodiments the situation information is any information relating to the current status of the container ship 1. However, the situational information can also include historical information, if necessary. In some embodiments the situation information comprises images and or videos from the cameras 304 showing one or more fields of view of around the container ship, LIDAR information, SONAR information, RADAR information, sound information from the microphones 312, GPS, movement information from accelerometers 338, and information from the maneuvering units 316, 318, 320, 322, 324. The cameras 304 and the microphones 312 can send real-time audiovisual information to the remote control centre 18.

Figure 4:
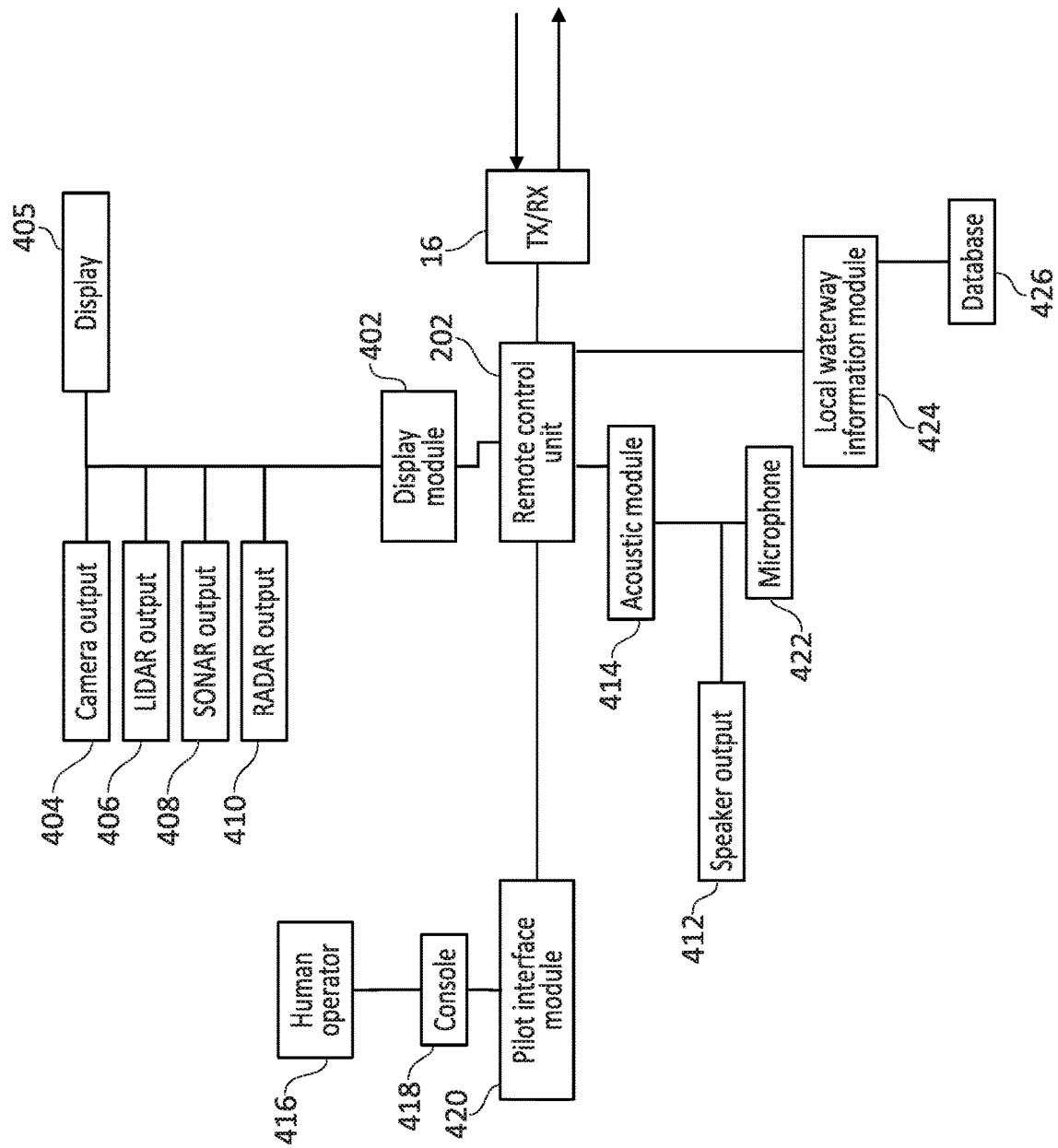
FIG. 4 shows a schematic diagram of a remote control centre.

The remote control centre 18 will now be discussed in reference to FIG. 4. FIG. 4 shows a reciprocal schematic diagram of the remote control unit 202. The remote control unit 202 is configured to process information relating to the container ship 1 and pilot control information based on situation information of the container ship 1. The ship control unit 202 comprises one or more modules for controlling systems within the remote control centre 18. In some embodiments the modules are part of the remote control unit 202. Alternatively, the functionality of the modules is located in one or more ancillary control units positioned on in the remote control centre, separate from the ship control unit 204. The functionality of the remote control unit 202 and the modules can be implemented with software, hardware or a combination of both.

The remote control unit 202 is connected to a transmitter-receiver arrangement 16. The remote control unit 202 is configured to receive situational information from the container ship 1 as mentioned with reference to FIG. 3.

The remote control unit 202 sends the visual information to a display module 402 relating to one or more of images and or videos from the cameras 304 showing one or more fields of view of around the container ship, LIDAR information, SONAR information, RADAR information, GPS, movement information from accelerometers 338, and information from the maneuvering units 316, 318, 320, 322, 324. The situation information can be output on one or more displays including a camera output display 404, LIDAR display 406, a SONAR display 408, and a RADAR display 410. Additional situational information such as information relating to one or more maneuvering units can further be displayed on additional or existing displays.

Sound information is sent by the remote control unit 202 to an acoustic module 414 to a speaker 412. In some embodiments the container ship 1 is provided with an acoustic sensor, such as a directional acoustic microphone arrangement with a 360° field of hearing in the horizontal plane. In an embodiment the ship control unit 204 is configured to transmit the audio signal from the directional acoustic microphone arrangement to the remote control centre 18.

In some embodiments, the remote control centre 18 is provided with display screens for displaying, in real-time and on a 360° circular array of display screens (not shown), the signal of the camera arrangement to the pilot 416 in the remote control centre 18. In some embodiments there are eight display screens in a circular arrangement but it is understood that fewer than eight display screens can be used in a circular arrangement and more than eight display screens can be used in a circular arrangement. Further, projectors or the like can be used instead to provide a single completely circumferential display screen. In an embodiment augmented reality is overlaid on one or more of the display screens, to show the situational information on the video image. For example, the SONAR, LIDAR or RADAR outputs are overlaid on the camera output. In other embodiments the display module 402 is configured to output the visual information to a virtual reality headset or other portable display screen.

The remote control unit 202 in some embodiments will be located in the remote control centre 18 on shore. The remote control centre 18 may not be in visual contact with the container ship 1. In this way the transmitted situation information from the container ship 1 allows the pilot in the remote control centre 18 to obtain a complete understanding of the immediate real-time status of the container ship.

The pilot 416 based on the situation information can create pilot control information. The pilot control information can take different forms. In some embodiments the pilot 416 issues guidance or advisory headings and speed to the container ship 1. The pilot 416 inputs the pilot control information via a console 418. The console 418 may replicate the controls and instruments on the container ship 1. In this way the pilot control information comprises adjustments and inputs into the helm, thrust control and the like. A pilot interface module records the console input and converts the inputs into control information. The pilot control information is then sent to the remote control unit 202 for transmission by the transmitter 16.

Alternatively, pilot control information can comprise course heading such as a bearing and a vessel speed. In this way the captain of the container ship 1 can interpret the pilot control information according to the responsiveness and maneuverability of the container ship 1. In some other embodiments, the pilot control information can comprise command instructions for the ship control unit 202. In yet other embodiments the pilot control information can comprise local precise information on waterways held in memory in a database 426 and local precise information is retrieved from the database 426 by an information module 424 based on the situation information. The pilot can also issue pilot control information which comprises audio signals which are captured by a microphone 422.

In an embodiment the remote control centre 18 comprises a portable remote control unit (not shown). This allows the pilot to be mobile on land or on water. The functionality of the remote control centre 18 is completely provided by a mobile electronic device. The remote control unit is configured for providing pilot control information. The pilot can enter instructions into the remote control unit via a user interface of the remote control unit. The remote control unit comprises a transmitter-receiver arrangement for transmitting and receiving information between the remote control centre 18 and the container ship 1 or directly with the container ship 1.

Figure 5:
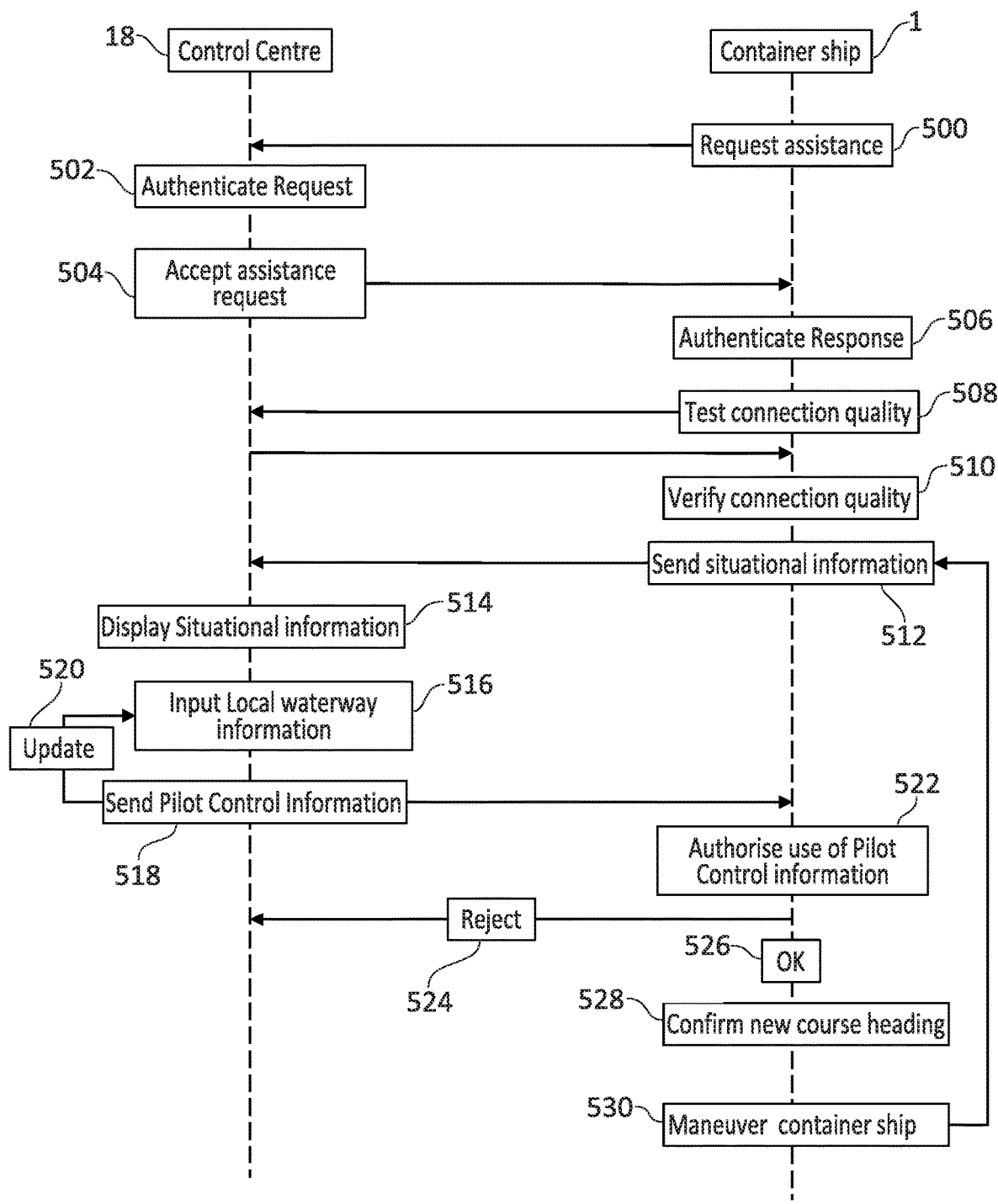
FIGS. 5 to 7 show flow diagrams of the communication between a ship and a remote control centre according to embodiments.
Figure 6:
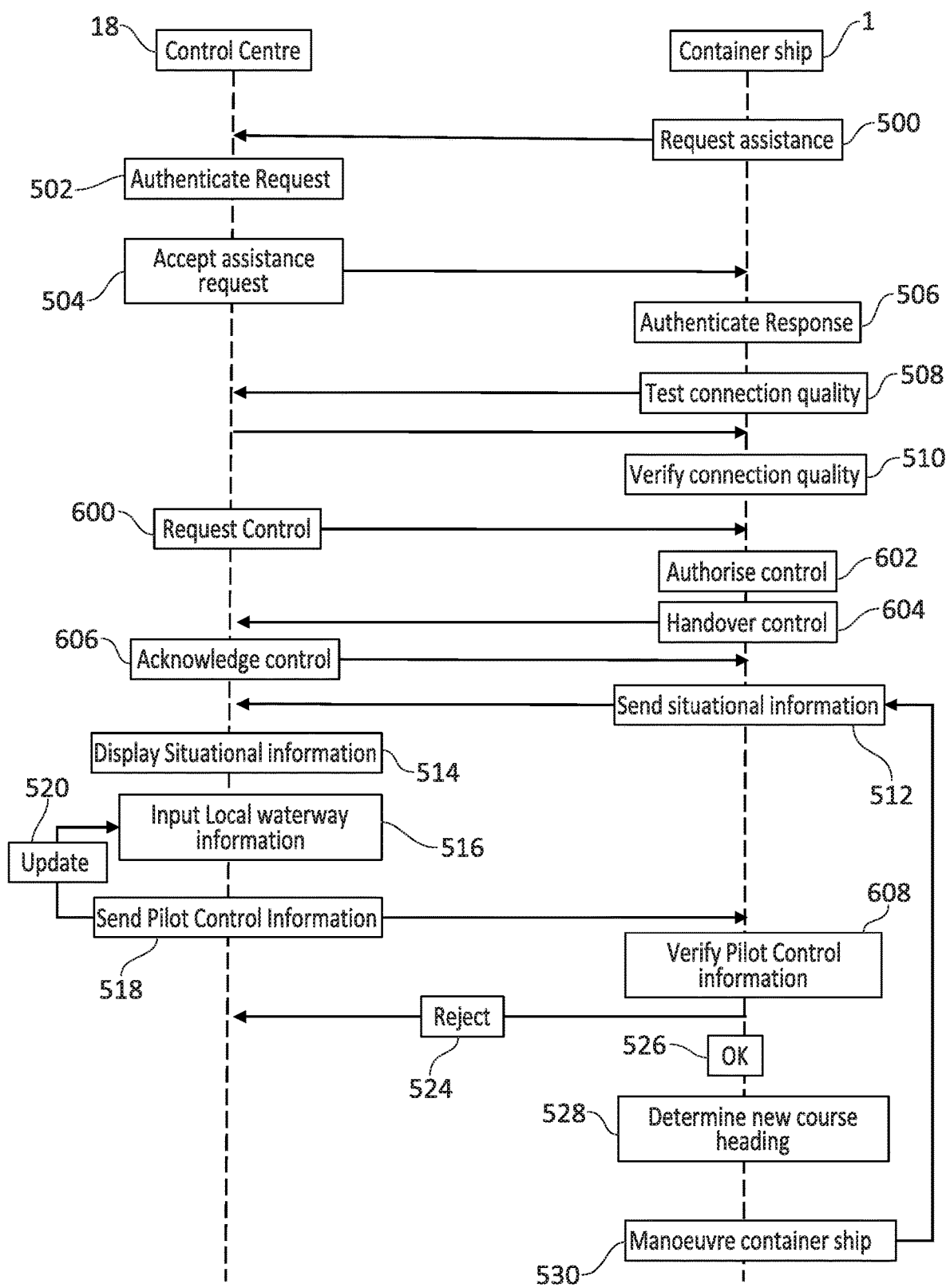
Figure 7:
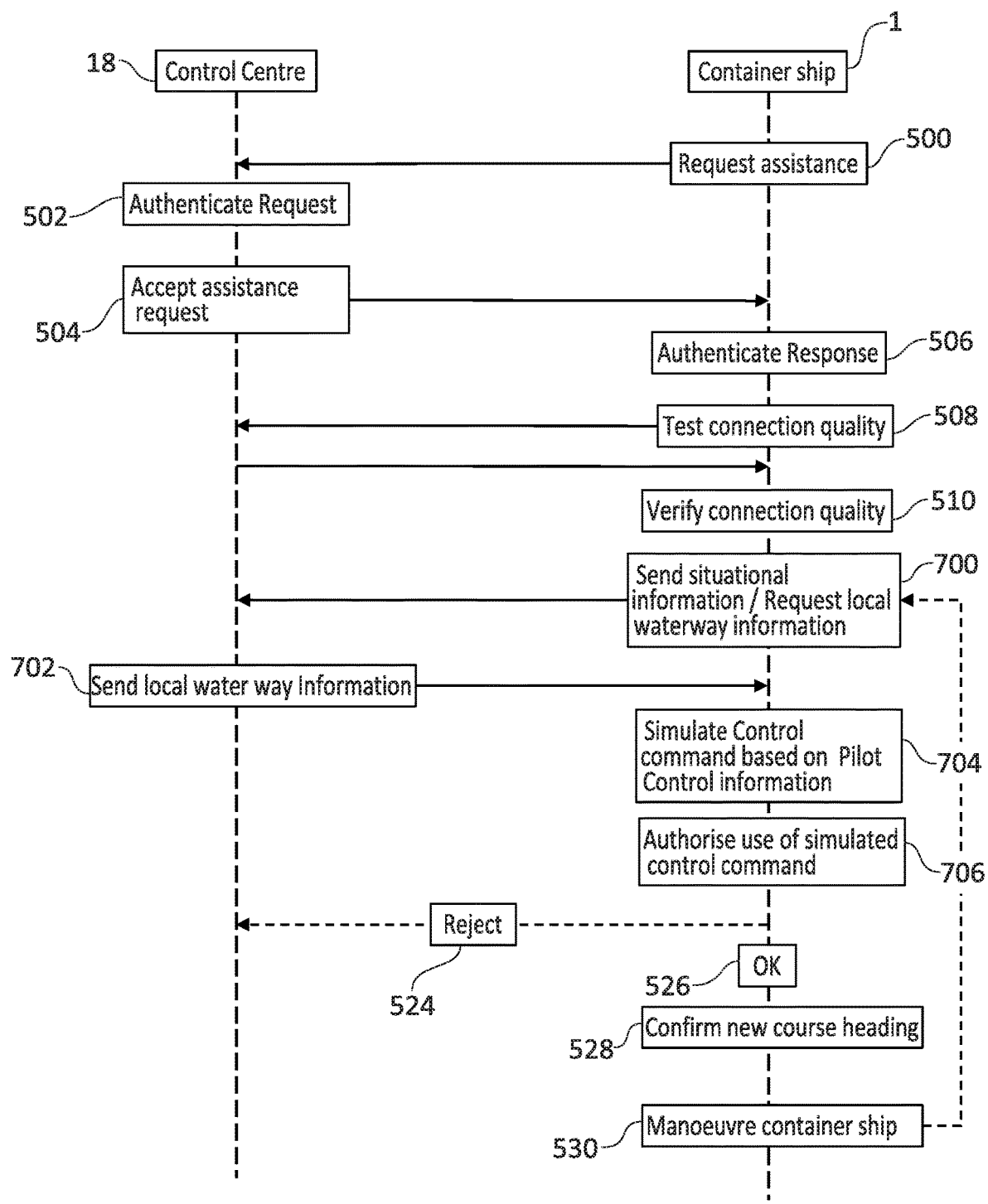

Operation of the ship control unit 204 and the remote control unit 202 will now be made in reference to FIGS. 5 to 7. FIGS. 5 to 7 show a schematic flow diagram of the interaction between the remote control centre 18 and the container ship 1.

Turning to FIG. 5, the operation of the container ship 1 request remote pilot assistance will now be discussed. When the container ship 1 is near a port, the container ship requests pilot assistance from the remote control centre 18. The ship control unit 204 sends a request assistance message 500. The request assistance message may comprise identification information of the container ship 1. The request assistance message 500 may be initiated by a crew member using the ship control interface 350. Alternatively, the request assistance message 500 may be automatically initiated by the ship control unit 204 when the container ship 1 reaches a certain distance of a destination port.

In order to prevent malicious attacks to the remote control centre 18 or the container ship 1, the communication between the container ship 1 and the remote control centre 18 is authenticated. Authentication protocols such as passwords may be used. Additionally, or alternatively, each container ship 1 and remote control centre 18 is issued with a unique encrypted authentication token. The authentication token is then attached to every message sent by the container ship 1 and/or the remote control centre 18. In other embodiments any suitable authentication process can be used.

The remote control unit 18 verifies and authenticates the content of the request assistance message 500 in step 502. As mentioned, checking the veracity of the content of the message and the authentication information is carried out to make sure the request assistance message 500 originated from the container ship 1.

Once the remote control centre 18 determines that the request assistance message 500 is correct and authentic, the remote control unit 202 sends an acceptance message 504 back to the container ship 1. Similarly, when the container ship 1 receives the accept assistance response 504, the ship control unit 204 carries out another authentication step in 506 to check the authenticity of the message from the remote control centre 18. The authentication step 506 is similar to the process discussed in reference to step 502.

Step 500 is initiated by the container ship 1, however, in other embodiments the remote control centre 18 initiates the remote pilot assistance process. For example, if the container ship 1 is near to a port, but has not yet requested pilot assistance, the remote control centre 18 may send a request message to offer assistance to the container ship 1. Once the communication link between the remote control centre 18 and the container ship 1 has been authenticated, the container ship 1 may optionally test the quality of the communication link.

The ship control unit 204 sends a message in step 508 to test the quality of the communication link established between the container ship 1 and the remote control centre 18. The remote control unit 202 sends a response to the quality test message. The ship control unit 204 determines whether the bandwidth and/or the latency and/or the packet loss of the communication link is acceptable in step 510. In some embodiments a latency of less than one second is acceptable. This means that the situation information that the pilot will receive will be less than 1 second behind the events in real-time.

In particular, some of the situation information such as real-time video may demand a high bandwidth. Accordingly, if there is a limited bandwidth, the amount of data that can be sent over the communication link may have to be reduced. In some embodiments the ship control unit 204 may determine that the bandwidth of the connection is too low 510 to send all the situation information to the control centre 18. The ship control unit 204 may send a limited amount of information such as a video from only a forward field of view of the container ship 1. In some embodiments, the ship control unit 204 rejects the remote pilot assistance because the communication link does not have sufficient bandwidth transmit all the necessary situation information to the remote control centre 18. This would mean that the pilot cannot generate informed pilot control information for advising the container ship 1 because he does not have access to all the status information of the container ship 1.

In some embodiments the quality connection test in step 508 can be initiated by the control centre 18. A similar determination can be made by the remote control unit 202 rather than the ship control unit 204.

Figure 10:
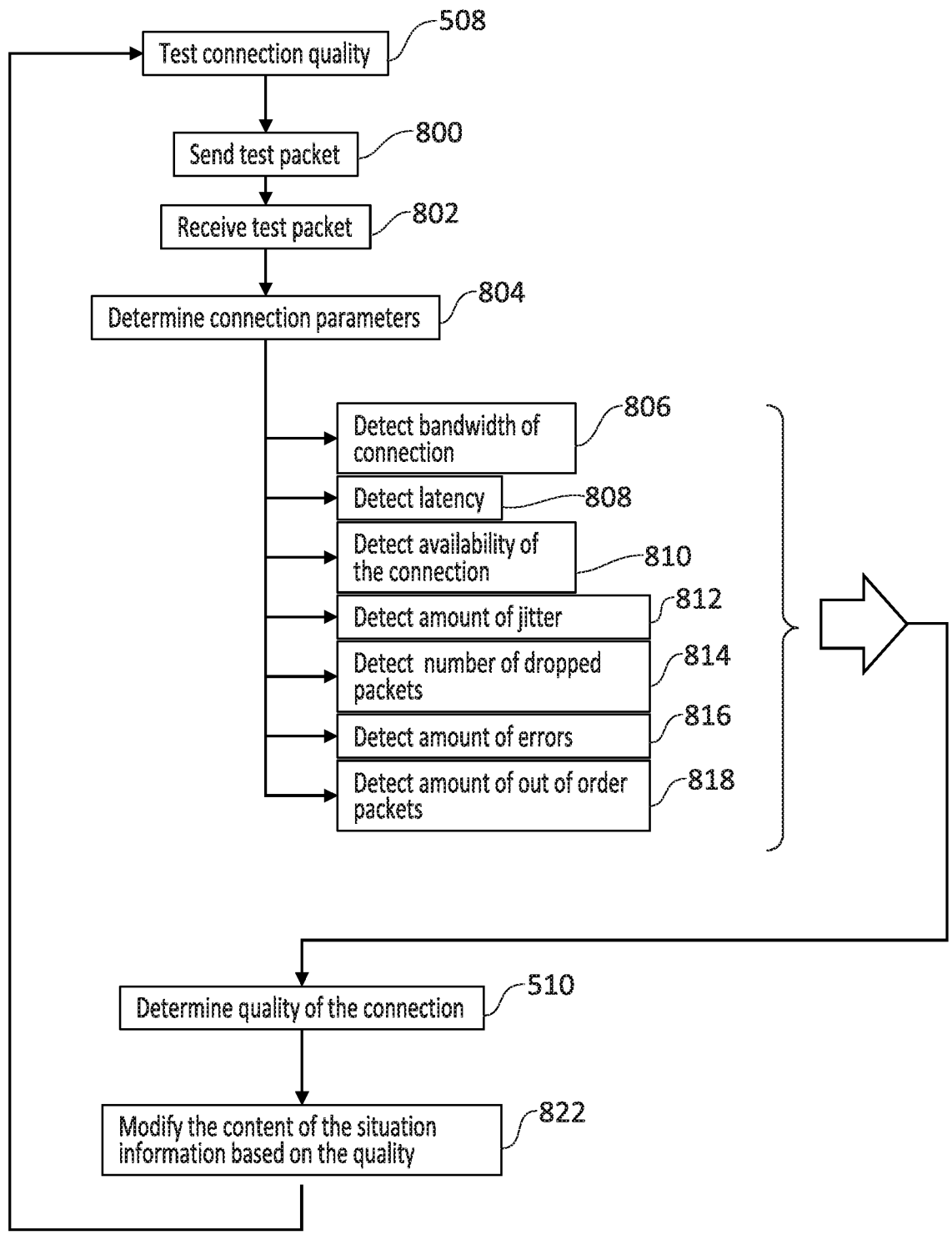
FIG. 10 shows a flow diagram for determining the quality of a connection between a ship and a remote control centre.

The step of 510 of testing the quality of the connection will be discussed in further detail with reference to FIG. 10 and the tables of FIGS. 8 and 9. FIG. 10 is a flow diagram representing the process of testing the quality of the connection. FIGS. 8 and 9 are tables representing an embodiment of a prioritization of the different types of situation information.

In order to test the connection, a test packet is sent as shown in step 800. The test packet is received in step 802. The ship control unit 204 can determine certain characteristics of the connection based on the received test packet. Various parameters of the connection can be determined by the ship control unit as shown in step 804. The step of determining the connection parameters 804 comprises actively and/or passively detecting parameters of the connection. For example, actively monitoring includes sending test packets as discussed in reference to steps 800 and 802.

In some embodiments the bandwidth and latency of the connection are determined as shown in steps 806 and 808. In other embodiments the quality of the connection can be determined from a single parameter of the connection. In other embodiments, the quality of the connection can be determined from a plurality of parameters of the connection. For example, packet loss of the connection may be the single parameter or one of the plurality of parameters.

The ship control unit 204 can determine the bandwidth of the connection in step 806 which indicates the used and/or available capacity of the connection link. The amount of available bandwidth will determine how much situation information can be sent from the ship control unit 204 to the remote control unit 202. In step 808 the ship control unit can determine the latency of the connection. The amount of delay in the connection will determine how representative the situation information is of real-time events. This will determine how effectively pilot control information can be provided by the remote control unit 202.

The connection may suffer from other connection and network errors that may affect the quality of the connection. In this way the ship control unit 204 can determine the availability of the connection 810, the amount of jitter in the connection 812, the number of dropped packets 814, the amount of errors and corrupted data 816, and the amount of out of order packets 818.

The ship control unit 204 can determine a quality of the connection in step 510. The quality of the connection is determined based on one or more determined parameters of the connection as previously discussed.

The ship control unit 204 may determine that the quality of the connection is acceptable and that all the situation information can be transmitted to the remote control unit 202. However, if the determined quality of the connection means that not all the of the information can be transmitted reliably, then the ship control unit 204 modifies the content of the situation information sent to the remote control unit 202 as shown in step 822.

In some embodiments the ship control unit prioritises different types of situation information based on the quality of the connection. FIGS. 8 and 9 respectively show a prioritization of the different situation information based on the parameters of latency and bandwidth. Other prioritization based on other connection parameters can also be carried out.

The situation information that changes quickly and requires constant update of data steam have the highest priority with respect to latency. It is important that the remote control centre 18 receives real time feeds so that prompt and accurate pilot control information can be sent back to the container ship 1. FIG. 8 provides an example prioritization of the type of situation information based on the latency. Some types of data such as GPS information can withstand a high latency especially if the container ship is slow moving. As mentioned the video feed requires a low latency in order to provide real-time information. In some circumstances, the video feed may not be feasible if the latency is too high. In this case the ship control unit 204 only sends the situation information which is less affected by a high latency. In examples, there may be a dynamic prioritization of the type of situation information based on the latency, for example with priorities of the different types dependent on a given scenario. For example, in a scenario where the ship is close to berthing, situation information from position sensors, e.g. 'sensor feed' in FIG. 8, may be prioritized over other types of situation information.

The ship control unit 204 determines the amount of bandwidth in step 806. If the ship control unit 204 determines that there is insufficient bandwidth to send all the situation information, the ship control unit 204 prioritises the type of situation information according to the example bandwidth prioritization list in FIG. 9. For example, an SD video feed has the highest priority because the pilot 416 needs to see where the ship is heading. However, a full HD feed may have a lower priority because the pilot 416 requires other information in preference such as the SONAR feed will which provide an indication of the under keel clearance of the container ship. As described above with regards to FIG. 10, there may be a dynamic prioritization of the type of situation information based on the bandwidth, for example depending on the given scenario.

In some embodiments the threshold for an acceptable quality of the connection is dependent on the current status of the container ship 1. The ship control unit 204 may determine that a higher latency and lower bandwidth is acceptable when the container ship is further out to sea.

In some embodiments the quality of the connection is repeatedly tested. This means that the types of the transmitted situation information may change as the quality of the connection varies.

In some further embodiments the remote control unit 202 comprises multiple connections to a plurality of different vessels. In this way the remote control unit 202 manages the connectivity between the remote control centre 18 and the plurality of ships.

In some embodiments the remote control unit 202 is configured to prioritise the available bandwidth between the plurality of vessel. The remote control unit 202 is configured to prioritise a first connection with a first ship over a second connection with a second ship based on the transmitted situation information. In some embodiments the remote control unit 202 prioritises the bandwidth of connections based on relative positions of the ships to the remote control centre. The remote control unit 202 prioritises bandwidth according to the proximity of the container ship 1 to a berthing position. For example, the remote control unit 202 prioritises a higher amount of bandwidth for a container ship 1 close to a berthing position, because the container ship 1 is closer to other objects and vessels. In contrast a container ship anchored at a waiting position out at sea does not require as much bandwidth.

In some embodiments the ship control unit 204 and/or the remote control unit 202 continue to carry out step 508 throughout the remote pilotage process. If the bandwidth of the communication link falls below predetermined threshold for transmitting a required amount of situation information, a warning can be issued to either the display 330 in the container ship 1 or the display 405 in the remote control centre 18. Similarly, if the latency of the communication link rises such above a threshold delay, a warning is issued. In some embodiments if the bandwidth is too low and/or latency is too high such that the pilot is not able to receive enough information and/or follow the container ship 1 with too high a delay, then the ship control unit 204 can stop the remote pilot process. In this case, the captain could make alternative arrangements for remote pilotage, for example continuing to communicate with the remote pilot over audio only e.g. over VHF radio.

Once the latency of the communication link has been determined to be acceptable, the ship control unit 204 sends situation information to the remote control unit 202 in step 512. The situation information is the information discussed in reference to FIGS. 3 and 4. The step 512 of sending situation information will be repeated throughout the remote pilotage process. In some embodiments the situation information is sent to the remote control centre 18 every time there is a change in the situation information. For example, real-time video feed may be streamed from the container ship 1 to the remote control centre 18.

In some embodiments the threshold for the communication link latency is dynamic. The threshold for an acceptable communication link latency can change depending on the current status of the container ship 1. For example, a higher the communication link latency of over 10 seconds may be acceptable several kilometers out to sea where there are fewer obstacles and ships. In contrast, the communication link latency may be required to be less than 100 ms when the container ship 1 is in port about to berth.

In some embodiments the threshold for the communication link bandwidth is dynamic. The threshold for an acceptable communication link bandwidth can change depending on the current status of the container ship 1. For example, a lower communication link bandwidth of 5 Mbs may be acceptable several kilometers out to sea where there are fewer obstacles and ships and low definition video may be acceptable. In contrast, the communication link bandwidth may be required to be more than 30 Mbs when the container ship 1 is in port about to berth and high definition video is required. For full 360-degree high definition video a bandwidth of over 80 Mbs may be required.

In step 514 the situation information is displayed in the remote control centre 18. In this way the remote control centre 18 comprises a virtual bridge of the container ship 1. The pilot 416 can therefore receive enough information to simulate that he is one the bridge of the container ship 1. The pilot 514 can then review the situation information of the container ship 1 in the context of the local waterway information as shown in step 516. The local waterway information can be stored in a database 426. The local waterway information may comprise detailed information which is not stored in general navigation charts. The local waterway information may comprise information on currents, swell, tides, depth and visual markers for guiding vessels into the port. Some of this information may also be the inherent experience of local waterways of the pilot. Having reviewed the situation information, the remote control unit 202 sends pilot control information back to the container ship as shown in step 518.

Optionally, there is a step 520 of updating the local waterway information database 426 based on the received situation information received from the container ship 1. In this way the container ship 1 can update changes to the waterways such as the depth of the shallow coastal waters. This may be particularly useful if the local waterways are prone to regular shifts in the navigation channels because of e.g. shifting sand bars. The situation information from the container ships 1 may be used as survey information of the local waterways.

The pilot control information comprises advisory instructions for how the container ship 1 should navigate through the local waterways. For example, the pilot control information may comprise a speed and heading for the ship to follow. The information can be transmitted for visual display or audio playback. The ship control unit 204 receives the speed and heading information and displays it on the display 330 in the bridge. The information can be represented as a text instruction, or as a graphical heading overlaid on a navigation chart. Additionally, or alternatively the pilot control information can be played as an audio instruction from the speakers 332.

Once the ship control unit 204 receives the pilot control information, the ship control unit authorizes use of the pilot control information in step 522. In some embodiments the ship control unit 204 adopts a default to use the pilot control information. For example, the helmsman may review the pilot control instructions such as a suggested course and heading and navigate the ship accordingly. The helmsman may repeat the pilot control information audibly to the bridge before making adjustments to the speed and course of the ship 1. By displaying the pilot control information, there is less risk of misinterpretation of pilot control instructions because the crew misheard or misunderstood guidance issued by the pilot. In some embodiments the ship control interface 350 comprises an input for overriding the pilot control instructions. In this way the captain can override and reject the pilot control instructions as shown in step 524. The ship control unit 204 sends a rejection message to the control centre 524. The captain may reject pilot control information because the container ship 1 will not maneuver in the way that the pilot anticipates. Alternatively, the captain's tolerance for issuing changes to the course and speed may be different to the pilot. For example, the captain may know that the container ship 1 cannot react quickly enough and the captain has not received a suitable pilot control information from the remote control centre 18. Accordingly, the captain can override the pilot control information and navigate the container ship 1 using alternative means.

The captain of the container ship 1 may reject the pilot control information for the final maneuver just before the container ship 1 is moored. This means the container ship 1 is under the manual control of the ship's crew without remote pilot assistance for the final movement of the container ship 1 in the port.

If the pilot control information is acceptable, the ship control unit 204 acknowledges that is OK in step 526. In some embodiments, the captain or crew member may signal via the ship control interface 350 that the pilot control information is OK at step 526 before the course and speed of the container ship 1 is changed based on each new pilot control information. Alternatively, the default is that all the pilot control information is acceptable unless the captain or the crew inputs that the pilot control information must be overridden.

The ship control unit 204 then receives information from the ship control interface module 340 that there is a new course heading and/or speed in step 528. The new course heading and speed is displayed on display 330 in some embodiments. The container ship 1 undergoes a maneuver according to the confirmed course heading as shown in step 530.

After the container ship 1 has undergone a maneuver, the situation information of the container ship 1 is updated. Step 512 is repeated and the updated situation information is sent to the remote control centre 18 again.

Another embodiment will now be described in reference to FIG. 6. FIG. 6 shows a schematic flow diagram of the communication between the remote control centre 18 and the container ship 1. FIG. 6 is the same as FIG. 5 except that the remote control centre 18 takes control of the ship. The steps of the process which are the same have the same reference number as shown in FIG. 5.

After the latency has been determined by the ship control unit 204 to be acceptable, the remote control unit 202 requests control of the container ship 1 in step 600. The request is so that the navigation and control of the one or more maneuvering units 316, 318, 320, 322, 324 can be controlled remotely from the remote control centre 18.

In step 602 the ship control unit 204 authorizes the remote control centre 18 to assume control of the container ship 1. The step of authorizing transfer of control of the container ship 1 is carried out by the ship control unit 204. In some embodiments an addition step of authorizing takes place in addition to the step of authenticating 506. The step of authorizing 602 includes the ship control unit 204 sending a verification request to the ship line control centre 200. Only when the ship line control centre 200 confirms that the transfer of the control of the container ship 1 is expected will, the ship line control unit 208 send a confirmation message back to the ship control unit 204. The ship control unit 204 will not release the control of the container ship 1 without confirmation first from the ship line control unit 208.

In some embodiments the transfer control requests from the remote control centre 18 to the ship line control centre 200 and the container ship 1, comprise different unique authentication tokens for the respective communication links. This may make malicious attacks more difficult.

Once the transfer of control request has been approved by the ship control unit 204 in step 602, the ship control unit 204 issues a confirmation message handing over control of the container ship 1 to the remote control unit 202. The remote control unit 202 sends an acknowledgement message 606 back to the container ship 1 to confirm that control has now been assumed by the remote control centre 18. In this way the ship control unit 204 receives instructions from the remote control unit 202 and carries out instructions according to the pilot control information. The pilot in the remote control centre 18 is able to remotely control the container ship 1 from the console 418.

Once control has been transferred, situation information is sent to the remote control centre 18 in step 512. This is the same as discussed in reference to the embodiments shown in FIG. 5.

The remote control unit 202 determines and generates pilot control information and transmits this to the container ship 1. Since the pilot has full control of the container ship 1, the pilot control information comprises commands for instructing the ship control unit 204 to change the course and speed of the container ship 1.

The ship control unit 204 receives the pilot control information. In step 608 the pilot control information is verified before the ship control unit 204 sends commands to the one or more maneuvering units. The step of verifying the pilot control information determines whether the instructions are in principle correct and do not affect the safety of the container ship 1. In some embodiments the ship control unit 204 sends the pilot control information to the pilot control information check module 344. The module 344 checks the pilot control information with the navigation module 346 and the collision avoidance module 348 to determine that the container ship will not collide with objects or navigate out of a navigable waterway based on the instructions in the pilot control information.

The step of verifying the pilot control information 608 can be used with the embodiment discussed in reference to FIG. 5. This means that verification step 608 can be carried out before the helmsman adjusts the course and speed of the container ship 1.

If the ship control unit 204 determines that the pilot control information would cause the container ship 1 to be placed in an unsafe position, the ship control unit can revoke control from the remote control centre 18 and return control back to the crew and captain. Additionally, the ship control unit 204 can return control back to the captain if an override command is issued which is similar to the process previously discussed in step 522.

Turning to FIG. 7 another embodiment will now be described. FIG. 7 is the same as shown in FIG. 5 except that the container ship 1 uses pilot control information received from the remote control centre to simulate pilot control commands.

In step 700 situation information is sent to the remote control centre 18. Alternatively, the ship control unit 204 request pilot control information from the remote control centre 18. The request can comprise situation information of the container ship 1. The situation information and/or the request can comprise position information of the container ship 1. The situation information can comprise additional information as discussed in reference to the previous embodiments.

In response to receiving the request, the remote control centre 18 sends local waterway information to the container ship 1. Local waterway information is retrieved based on the situation information send by the container ship 1.

The ship control unit 204 receives the local waterway information in step 704. Based on the local waterway information, the ship control unit 204 generates simulated control commands for navigating the container ship 204 into the port.

Similar to the previous embodiments, the captain can authorise use of the pilot control information as set out step 706. The step of authorizing 706 is similar to the steps 522 or 608.

In another embodiment two or more embodiments are combined. Features of one embodiment can be combined with features of other embodiments.

Embodiments of the present invention have been discussed with particular reference to the examples illustrated. However, it will be appreciated that variations and modifications may be made to the examples described within the scope of the invention.

For example, embodiments are envisaged wherein the system is configured to determine the quality of a plurality of connections between the ship and the remote control centre. The plurality of connections may comprise a plurality of communication links, for example one or more of: a cellular link (e.g. 3G or 4G), a wireless local area network (WLAN) link (e.g. Wi-Fi®), and a satellite link. Based on the respective quality of each of the connections, the system may allocate different communication links to different types of information, for example depending on a specific performance requirement of one or more of the communication links. For example, the system may route information from video cameras via the cellular (e.g. 4G) link and RADAR or LIDAR information via the WLAN or satellite link, wherein the cellular link has a lower latency than the WLAN and satellite links. The higher latency of the WLAN or satellite link may be less important for the RADAR or LIDAR data stream, for example.

In some examples, a video output stream from a camera on the ship may be adapted by an encoder on the ship. For example, the encoder may dynamically adapt the video quality based on the available connection, e.g. automatically changing one or more settings of the encoder to match the video output stream with the available bandwidth, latency, and/or packet loss of the connection.

Embodiments are also envisaged wherein the system implements network redundancy on the ship. For example, there may be duplicated or redundant links to the or each sensor, e.g. between the sensor(s) and the ship control unit, and/or overlapping ranges of the sensor(s), such that if a given sensor fails, one or more other sensors may still be able to communicate information. In examples, the system may apply appropriate prioritizations, e.g. reprioritize the types of situation information, such that safety information is able to be communicated. For example, the system may apply appropriate prioritizations in response to one of a plurality of connections, between the remote control centre and the ship, failing, such that safety information is maintained as transmittable between the remote control centre and the ship.

While the preferred embodiments of the system, ship and method have been described in reference to the environment in which they were developed, they are merely illustrative of the principles of the invention. The elements of the various embodiments may be incorporated into each of the other species to obtain the benefits of those elements in combination with such other species, and the various beneficial features may be employed in embodiments alone or in combination with each other. A single controller or control unit may be formed by a combination of controllers or control units. Other embodiments and configurations may be devised without departing from the scope of the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

What is claimed is:
1. A system for controlling a ship comprising:
   a ship having:
      a ship control unit configured to determine situation information of the ship; and a transmitter-receiver connected to the ship control unit and configured to transmit the situation information; and a remote-control center remote from the ship comprising:
a transmitter-receiver configured to receive situation information of the ship;
and a remote-control unit configured to determine pilot-control information for maneuvering the ship based on the situation information and configured to transmit the pilot-control information to the ship via the transmitter-receiver of the remote-control center,
wherein the ship control unit or the remote-control unit is configured to determine a quality of a connection between the transmitter-receiver of the ship and the transmitter-receiver of the remote-control center,
wherein, based on the determined quality of the connection, the ship control unit or the remote control unit is configured to prioritize the situation information transmitted from the ship to the remote-control center, based on a type of the situation information,
wherein the ship control unit or the remote-control unit is configured to prioritize available bandwidth for the connection between the transmitter-receiver of the ship and the transmitter-receiver of the remote-control center based on the situation information, and
wherein the available bandwidth is prioritized based on a proximity of the ship to a berthing position.

2. A system according to claim 1, wherein the ship control unit or the remote-control unit is configured to determine the quality of the connection on the basis of a determination of a latency of the connection.

3. A system according to claim 2, wherein the determination of the latency comprises a determination as to whether a delay is below a predetermined operational latency threshold.

4. A system according to claim 3, wherein at least one of:
if the delay is above the predetermined operational latency threshold, the ship control unit or the remote-control unit is configured to prioritize the situation information, based on a type of the situation information, transmitted from the ship to the remote-control center; or
the predetermined operational latency threshold is dynamic such that the predetermined operational latency threshold is changeable in dependence on a status of the ship.

5. A system according to claim 4, wherein the quality of the connection is repeatedly tested, such that the types of the situation information transmitted are changeable in dependence on the quality of the connection.

6. A system according to claim 1, wherein the ship control unit or the remote-control unit is configured to determine the quality of the connection on the basis of a determination of a bandwidth of the connection.

7. A system according to claim 6, wherein the determination of the bandwidth comprises a determination as to whether the bandwidth is above a predetermined operational bandwidth threshold.

8. A system according to claim 7, wherein at least one of:
if the bandwidth is below the predetermined operational bandwidth threshold, the ship control unit or the remote-control unit is configured to prioritize the situation information, based on a type of the situation information, transmitted from the ship to the remote-control center; or the predetermined operational bandwidth threshold is dynamic such that the predetermined operational bandwidth threshold is changeable in dependence on a status of the ship.

9. A system according to claim 1, wherein the ship control unit or the remote-control unit is configured to determine the quality of the connection based on a reliability of the connection.

10. A system according to claim 1, wherein the remote-control unit is configured to prioritize a first connection between the transmitter-receiver of the ship and the transmitter-receiver of the remote-control center, and a second connection between a transmitter-receiver of another ship and a transmitter-receiver of the remote-control center, based on situation information of the respective ships.

11. A system according to claim 10, wherein the remote-control unit is configured to prioritize a bandwidth of the first connection and second connection based on relative positions of the respective ships to the remote-control center.

12. A system according to claim 1, wherein the ship is a container ship.

13. A remote-control center for controlling a ship, said remote-control center comprising:
a transmitter-receiver configured to receive situation information of the ship; and
a remote-control unit configured to determine pilot-control information for maneuvering the ship based on the situation information and configured to transmit the pilot-control information to the ship,
wherein the remote-control unit is configured to determine a quality of a connection between the ship and the transmitter-receiver of the remote-control center,
wherein, based on the determined quality of the connection, the remote-control unit is configured to prioritize the situation information received from the ship, based on a type of the situation information,
wherein the remote-control unit is configured to prioritize available bandwidth for the connection between the ship and transmitter-receiver of the remote-control center based on the situation information, and
wherein the available bandwidth is prioritized based on a proximity of the ship to a berthing position.

14. A ship, comprising:
a ship control unit configured to determine situation information of the ship; and
a transmitter-receiver connected to the ship control unit and configured to transmit the situation information to a remote-control center and receive pilot control information for maneuvering the ship, determined based on the situation information, from the remote-control center;
wherein the ship control unit is configured to determine a quality of a connection between the transmitter-receiver of the ship and the remote-control center,
wherein, based on the determined quality of the connection, the ship control unit is configured to prioritize the situation information transmitted to the remote-control center, based on a type of the situation information,
wherein the ship control unit is configured to prioritize available bandwidth for the connection between the transmitter-receiver of the ship and the remote-control center based on the situation information, and
wherein the available bandwidth is prioritized based on a proximity of the ship to a berthing position.

15. A ship according to claim 14, wherein the ship control unit is configured to at least one of:

determine the quality of the connection based on a determination of at least one of a latency or the available bandwidth of the connection.

16. A ship according to claim 15, wherein:
the determination of the latency comprises a determination as to whether a delay is below a predetermined operational latency threshold; and
the determination of the available bandwidth comprises a determination as to whether the bandwidth is above a predetermined operational bandwidth threshold.

17. A ship according to claim 16, wherein if at least one of:
in the determination of the latency, the delay is above the predetermined operational latency threshold; or
in the determination of the available bandwidth, the bandwidth is below the predetermined operational bandwidth threshold;
the ship control unit is configured to prioritize the situation information, based on a type of the situation information, transmitted from the ship to the remote-control center.

18. A ship according to claim 16, wherein at least one of:
the predetermined operational latency threshold is dynamic such that the predetermined operational latency threshold is changeable in dependence on a status of the ship; or
the predetermined operational bandwidth threshold is dynamic such that the predetermined operational bandwidth threshold is changeable in dependence on a status of the ship.

19. A method for controlling a ship comprising:
receiving situation information of the ship in a control center remote from the ship;
determining pilot-control information for maneuvering the ship based on the situation information;
transmitting the pilot-control information to the ship,
receiving the pilot-control information in a ship control unit of the ship;
determining a quality of a connection between the ship and the remote-control center;
based on the determined quality of the connection, prioritizing the situation information based on a type of the situation information; and
based on the situation information, prioritizing available bandwidth for the connection between the ship and the remote-control center,
wherein the available bandwidth is prioritized based on a proximity of the ship to a berthing position.

* * * * *